P. E. TALL.
REVOLVING HARROW.
APPLICATION FILED APR. 2, 1912.
1,051,172.
Patented Jan. 21, 1913.
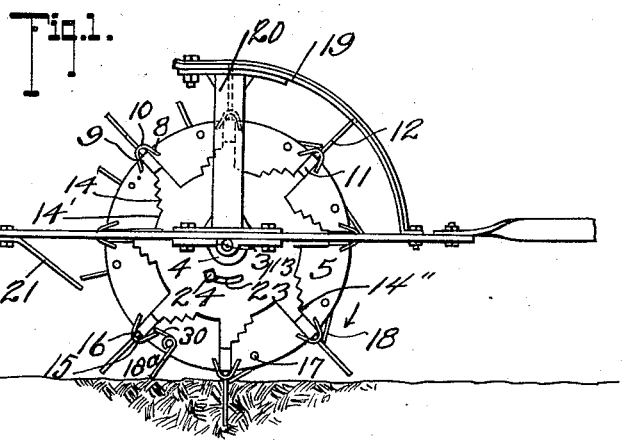
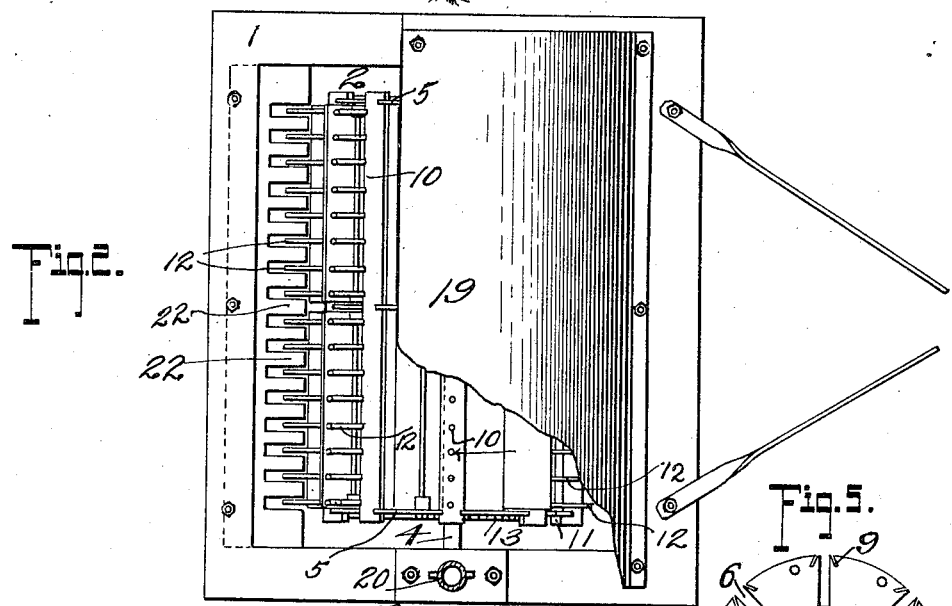
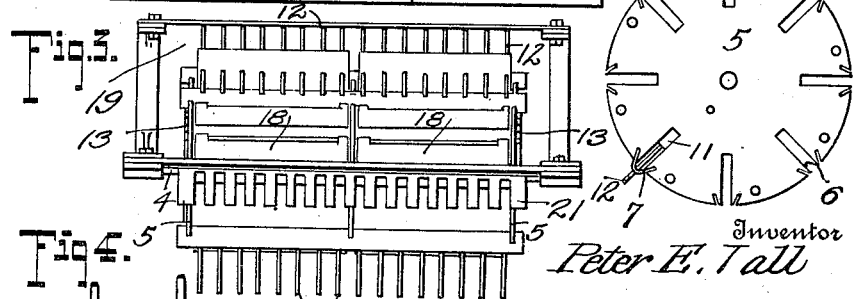
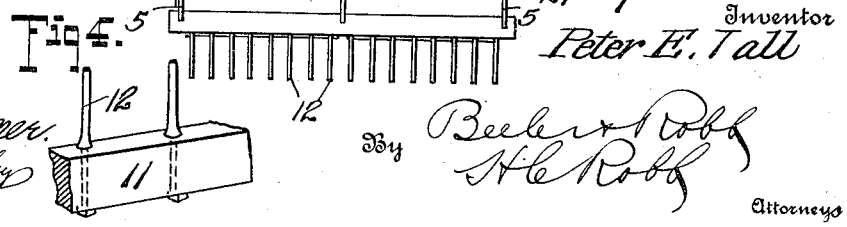
Inventor
Peter E. Tall
Witnesses
C. H. Wagner
G. W. Kirkley
By Beeler & Robb
H. C. Robb
Attorneys

UNITED STATES PATENT OFFICE.

PETER E. TALL, OF NIOBE, NORTH DAKOTA.

REVOLVING HARROW.

1,051,172.

Specification of Letters Patent. Patented Jan. 21, 1913.

Application filed April 2, 1912. Serial No. 687,951.

*To all whom it may concern:*

Be it known that I, PETER E. TALL, a citizen of the United States, residing at Niobe, in the county of Ward and State of North Dakota, have invented certain new and useful Improvements in Revolving Harrows, of which the following is a specification.

The present invention relates to revolving harrows and consists particularly of improvements in harrows which comprise disks carrying adjustable harrow elements, which disks are capable of rotary movement when the structure is dragged over the ground to be harrowed; a device for removing the adhering soil from the harrow elements, and devices arranged on the disks for preventing the entrance of dirt and stones to the interior harrow structure.

The object of the invention is to provide a construction of the character described, whereby the position of the harrow elements may be adjusted with reference to the disks, so that the elements may penetrate the ground to any depth desired.

To this end, the invention consists in providing transverse bars or beams carrying a row of harrow elements which may be spikes, pins, or teeth, and special disks provided with novel means hereinafter described for engaging said bars or beams to hold the same in a selected or predetermined position, depending upon the depth of penetration desired by the spikes or teeth.

A further object is to so construct a harrow having the above characteristics in such a manner as to secure simplicity and cheapness of construction of the working parts, and to eliminate all delicately constructed parts liable to get out of order easily, and also to obviate the use of sprocket chains, gears and complex lever movements.

For a full understanding of the present invention, reference is to be had to the following description and to the accompanying drawings, in which—

Figure 1 is a side elevation of the improved harrow. Fig. 2 is a top plan view, showing the covering hood partly broken away. Fig. 3 is a rear elevation of the device. Fig. 4 is a fragmentary perspective view of one of the bars or beams which carry the harrow elements. Fig. 5 is a detail view of one of the disks on which said bars or beams are adjustably mounted.

Throughout the following detail description and on the several figures of the drawings, similar parts are referred to by like reference characters.

Referring particularly to the drawings, 1 indicates the frame of a harrow which may preferably be substantially rectangular in shape and provided with an open portion 2 for the working parts of the device. Suitably journaled in bearings 3 at the opposite sides of the frame 1 is a central shaft 4 capable of rotation in said bearings. Secured at spaced intervals to the shaft 4 and in fixed positions on the same, are the disks 5, preferably three in number and of substantially circular shape, which disks afford the carrying means for the adjustable harrow elements.

Each of the disks 5 is provided at spaced intervals in its periphery with a plurality of notches 6, and the notches will be in such position on the several disks that corresponding notches will be in alinement, so that a straight bar or beam may engage in the same. Extending transversely across the three disks 5 are provided a series of casings or trough-shaped members 7, one being placed so as to cover a series of three alined notches, one on each disk, and the ends 8 of the casings 7 are adapted to enter slots 9 formed in the disks, one to each side of the notch 6, in the manner particularly shown in Figs. 1 and 5.

Each of the casings 7 is provided throughout its length on its outer edge at suitably spaced intervals, with holes 10 through which the harrow spikes or teeth, hereinafter referred to, play. The radial notches 6 formed in the periphery of the disks 5 each receive and guide a bar 11, on which are provided at spaced intervals corresponding to the holes 10, a series of harrow elements 12, which may be either teeth, spikes, or pins, and which enter the soil when the disks are rotated. The bars 11 are capable of free radial movement in the notches 6, and the latter must be formed of such inward depth as to allow free movement to the desired extent. It will be noted from the drawings that each of the bars 11 extends transversely from the outermost disk 5 at one end of the machine to that at the opposite end, and each end of the bar extends a short distance outside each of the outermost disks, in order to be engaged by the adjusting disks, hereinafter referred to.

The adjusting disks are numbered 13 in the drawings and are freely mounted on the shaft 4 at a position between the outermost disks 5 and the bearings 3 of the shaft 4. Each of the adjusting wheels 13 is cut away at a plurality of places in its periphery, in number corresponding to the number of longitudinal toothed bars 11 before referred to, so as to form a series of radial tongues, each of which is notched on one side to form a plurality of engaging shoulders 14, which latter, as they are taken on successive radii of the disk, increase in distance from the axial center of the disk from the lowermost one 14' to the outermost one 14''. The bars 11 being freely movable in their notches on the disks 5, can engage any one of the shoulders 14 formed on the disk 13 so that the teeth 12 may project through the openings in the casings 7 to any extent desired, and all of the bars 12 being correspondingly adjusted with reference to any selected shoulder on the disk 13, the teeth 12 will, of course, enter the ground to a desired depth. Any suitable fastening means may be employed for maintaining the engagement of the bars 12 with a selected or predetermined shoulder 14, but in the drawings I have shown a series of pins 15, one at each end of each of the bars 11, said pins being spring pressed and engaging the inner portion 16 of each of the casings 7. These pins thus tend to normally press the bars 12 radially inwardly and hold them in their engagement with the shoulders 14.

The disk 13 is provided at a suitable position with a curvilinear slot 23 through which passes a bolt 24 also passing through the adjacent disk 5. By this means the disk 13 may be held in any adjusted position with reference to the disk 5, and relative rotation thereto prevented.

Between each pair of the casings 7 and their contained bars 11 is arranged a transversely extending shaft 17 which passes through each of the disks 5 at a point near their outer peripheries. On each of the shafts 17 is arranged a pair of freely swinging plates 18, each plate being placed between the outermost disk and centrally disposed disk 5. The purpose of these swinging plates is to prevent dirt and stones from being thrown into the trough-shaped members 7 when the teeth which pass through them enter the ground. On reference to Fig. 1, it will be seen that as the disks 5 rotate in the direction of the arrow on the forward movement of the machine, the freely swinging plates 18 will tend, before a certain casing 7 engages the ground, to swing in a somewhat tangential direction, the outer end of the plate closely approaching the outer portions of the casing 7. At the time of the engagement of any one of the casings 7 with the ground, the swinging plate will assume the position shown with respect to the lowermost one illustrated in Fig. 1, where it bites into the lower end of the casing, and thus effectively prevents dirt or stones being thrown upwardly into the casing. After any one of the casings 7 has passed the point of its engagement with the soil, the plates 18 then swing into the position shown at 18ᵃ in Fig. 1 of the drawings, the outward movement of each plate with respect to the casing 7 being limited by means of a stop-plate 30, which is preferably formed integral with the plate 18 and engages the adjacent end of casing 7.

A curved hood 19, preferably formed of sheet metal is connected to the front portion of the frame 1 of the machine, extends in an upward direction covering a portion of the disks 5, and is connected at its upper opposite ends by means of the standards 20 with the sides of the frame of the machine.

On the rear portion of the frame, is arranged a fender or guard 21 provided with a plurality of forwardly extending spaced tongues 22, corresponding in number to the number of pins or teeth on the bars 11. The tongues 22 will be so arranged with reference to the longitudinal arrangement of the teeth or pins that the latter will pass through the spaces between the tongues and said tongues will tend to scrape off any adhering soil on the casings 7 and teeth 11.

Having thus described the invention, what is claimed as new is:

1. In a harrow, a main frame, a series of teeth carrying members, a rotary structure in which said members are radially movable outwardly and inwardly with respect to the axis thereof, and a disk having portions of its periphery cut away to afford a plurality of sets of shoulders, said sets corresponding in number to the number of teeth carrying members employed, and the different shoulders of each set having varying radial distances from the axis of the disk, selected corresponding shoulders of the different sets being adapted to engage said teeth carrying members.

2. In a harrow, a main frame, a plurality of rotary disks mounted in said frame, a series of teeth carrying members mounted on said disks and capable of radial outward and inward movement with respect to the disks, and a disk having portions of its periphery cut away to afford a plurality of sets of shoulders, said sets corresponding in number to the number of teeth carrying members employed, and the different shoulders of each set having varying radial distances from the axis of the disk, selected corresponding shoulders of the different sets being adapted to engage said teeth carrying members.

3. In a harrow, a main frame, an axle journaled therein, a series of teeth carrying members, a rotary structure mounted on said axle in which said members are radially movable outwardly and inwardly with respect to the axle, and a disk freely movable on the axle, said disk being provided with a plurality of sets of shoulders corresponding in number to the number of teeth carrying members employed, and the different shoulders having varying radial distances from said axle, a selected shoulder being adapted to engage a teeth carrying member.

4. In a harrow, a main frame, a series of teeth carrying members, a rotary structure in which said members are radially movable outwardly and inwardly with respect to the axis thereof, a disk independently rotatable with respect to the rotary structure and having a plurality of sets of shoulders, said sets corresponding in number to the number of teeth carrying members employed, and the different shoulders of each set having varying radial distances from the axis of the disk, selected corresponding shoulders of the different sets being adapted to engage said teeth carrying members, and means for maintaining said disk in an adjusted position with respect to the rotary structure.

5. In a harrow, a main frame, a series of teeth carrying members, a rotary structure in which said members are radially movable outwardly and inwardly with respect to the axis thereof, a disk provided with a successively shouldered portion for engaging said teeth carrying members, and means of rotary adjustment of the disk for bringing the shoulders successively into line with the teeth carrying members, whereby the latter may be sustained at a greater or lesser distance from the axis of the rotary structure.

6. In a harrow, a main frame, a series of teeth carrying members, a rotary structure in which said members are radially movable outwardly and inwardly with respect to the axis thereof, a disk provided with means for engaging said teeth carrying members whereby the latter may be positioned at a greater or lesser distance from the axis of the rotary structure, said disk being independently rotatable with respect to the rotary structure, means for maintaining said disk in an adjusted position with reference to the rotary structure, and means for maintaining the teeth carrying members in an adjusted position with reference to said disk.

7. In a harrow, a main frame, an axle journaled in said main frame, a plurality of rotary disks mounted on said axle, said disks being provided with a plurality of radial notches in their peripheries, corresponding notches of the several disks being in substantial alinement, a series of teeth carrying members mounted in said notches and being capable of radial outward and inward movement with respect to said axle, and a disk having portions of its periphery cut away to afford a plurality of sets of shoulders, said sets corresponding in number to the number of teeth carrying members employed, and the different shoulders of each set having varying radial distances from said axle, selected corresponding shoulders of the different sets being adapted to engage said teeth carrying members.

8. In a harrow, a main frame, an axle journaled in said main frame, a plurality of rotary disks mounted on said axle, said disks being provided with a plurality of radial notches in their peripheries, corresponding notches of the several disks being in substantial alinement, casings mounted at the outer periphery of the disks so as to cover the alined corresponding notches, each casing being provided with a plurality of holes in its outer end, a series of teeth carrying members arranged in said casings, and in said notches, said members being capable of inward and outward movement in the notches with respect to said axle, the teeth carried by said members passing through the holes of said casings, a disk having portions of its periphery cut away to afford a plurality of sets of shoulders, said sets corresponding in number to the number of teeth carrying members employed and the different shoulders of each set having varying radial distances from said axle, selected corresponding shoulders of the different sets being adapted to engage said teeth carrying members, means for maintaining the teeth carrying members in their adjusted positions with respect to said shoulders, and a plurality of swinging plates disposed on said first named disks adjacent to said casings and adapted to prevent the entrance of dirt into said casings.

In testimony whereof I affix my signature in presence of two witnesses.

PETER E. TALL.

Witnesses:
S. M. SORENSON,
C. W. WESTERGREN.